United States Patent [19]

Siegmund

[11] 4,345,833

[45] Aug. 24, 1982

[54] LENS ARRAY

[75] Inventor: Walter P. Siegmund, Woodstock, Conn.

[73] Assignee: American Optical Corporation, Southbridge, Mass.

[21] Appl. No.: 237,327

[22] Filed: Feb. 23, 1981

[51] Int. Cl.³ .................. G03B 27/00; C03C 25/00
[52] U.S. Cl. .......................... 355/1; 65/3.14; 264/1.5; 350/96.31
[58] Field of Search .................. 65/3.11, 3.14, 2; 350/96.31; 355/1; 427/163; 264/1.5; 358/294

[56] References Cited

U.S. PATENT DOCUMENTS

| | | | |
|---|---|---|---|
| 2,980,957 | 4/1961 | Hicks, Jr. ............................ | 65/2 |
| 3,037,241 | 6/1962 | Bazinet, Jr. et al. ................ | 65/3.11 |
| 3,253,896 | 5/1966 | Woodcock et al. ................. | 65/3.11 |
| 3,279,903 | 10/1966 | Siegmund .......................... | 65/3.11 X |
| 3,350,183 | 10/1967 | Siegmund et al. ................. | 350/96.31 X |
| 3,398,669 | 8/1968 | Hicks, Jr. ............................ | 355/1 |
| 3,574,582 | 4/1971 | Siegmund et al. ................. | 65/3.11 X |
| 3,609,233 | 9/1971 | Nagao ................................ | 358/294 |
| 3,619,030 | 11/1971 | Tomii .................................. | 355/1 X |
| 3,658,407 | 4/1972 | Kitano et al. ....................... | 355/1 X |
| 3,761,234 | 9/1973 | Siegmund .......................... | 65/3.11 |
| 3,782,914 | 1/1974 | DeLuca et al. .................... | 65/3.14 X |
| 3,822,121 | 7/1974 | Koizumi et al. .................... | 65/3.14 X |
| 3,930,714 | 1/1976 | Dyott .................................. | 65/3.11 X |
| 4,095,888 | 6/1978 | Kawazu et al. .................... | 355/1 X |
| 4,154,500 | 5/1979 | Funato et al. ...................... | 355/1 X |
| 4,229,197 | 10/1980 | Streng ................................ | 65/3.11 X |
| 4,231,775 | 11/1980 | Siegmund .......................... | 350/96.31 X |
| 4,246,016 | 1/1981 | Siegmund .......................... | 65/3.14 |
| 4,264,130 | 4/1981 | Ogura ................................ | 350/96.31 X |
| 4,275,951 | 6/1981 | Beales et al. ....................... | 65/3.14 X |
| 4,275,962 | 6/1981 | Midorikawa et al. .............. | 355/1 |

Primary Examiner—Richard A. Wintercorn
Attorney, Agent, or Firm—Alan H. Spencer

[57] ABSTRACT

An array of gradient refractive index lenses designed to produce an erect image of an extended object. The lenses are supported in a matrix of light-absorbing cladding glass for stray light control.

6 Claims, 6 Drawing Figures

U.S. Patent      Aug. 24, 1982      4,345,833
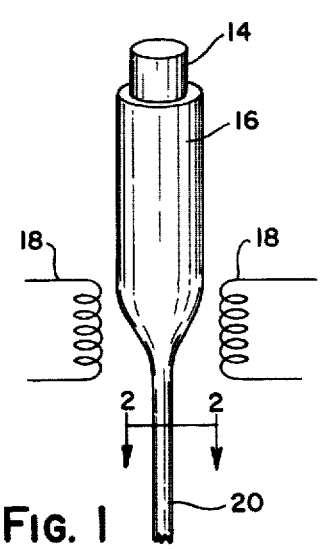
FIG. 1
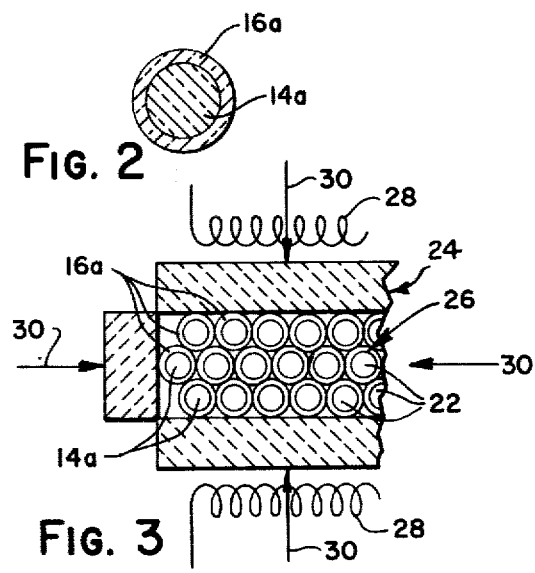
FIG. 2
FIG. 3
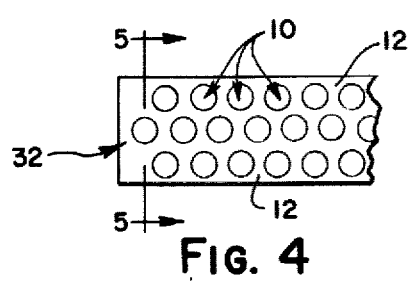
FIG. 4
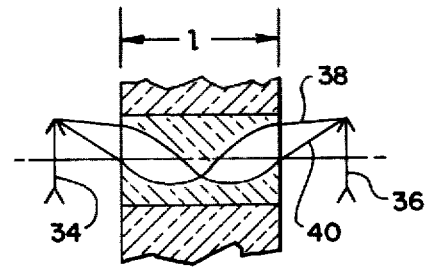
FIG. 5
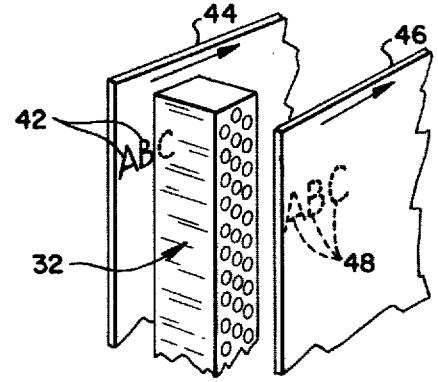
FIG. 6

LENS ARRAY

BACKGROUND OF THE INVENTION

1. Field of the Invention

This invention relates to imaging lens systems and has particular reference multi-lens image projection.

2. Discussion of the Prior Art

Strip object imaging, e.g. as in copier application, usually employs complex lens systems and/or optical fiber bundles requiring the formation of images on bundle receiving faces and utilization of transported images appearing on bundle emitting faces. U.S. Pat. Nos. 3,398,669; 3,609,233 and 4,190,347 are exemplary.

Microlenses of the self-focussing type are also known for their particular adaptability to copier or similar application when multiply juxtapositioned. This lens juxtapositioning, however, is attended with stray light problems, i.e. light escaping from one lens to another, and difficulty of manufacture including tediousness of accurate assembly and resulting excessive product cost.

Accordingly, it is an object of the present invention to overcome the drawbacks of present day gradient refractive index lens arrays and their costliness of manufacture with improved product design and novel method of making same.

Other objects and advantages of the invention will become more readily apparent from the following description.

SUMMARY OF THE INVENTION

The invention provides an array (e.g. strip or plate) of gradient refractive index lenses in a supporting medium of light-absorbing material which prevents stray light interference during use of the array and further avoids potentially disturbing light reflection at interfacing of the lenses and supporting medium.

Details of the invention will become apparent from the following description when taken in conjunction with the accompanying drawings.

IN THE DRAWINGS

FIGS. 1, 2 and 3 illustrate a technique for producing an array of lenses according to the present invention;

FIG. 4 is a fragmentary elevational view of a lens array, the array being in strip form;

FIG. 5 is a cross-sectional view of a portion of the array taken approximately along line 5—5 of FIG. 4; and FIG. 6 is a diagramatic illustration, in perspective, of image copying use of the lens array.

DESCRIPTION OF THE PREFERRED EMBODIMENTS

In the present relationship to multiple element gradient refractive index lens arrays, FIGS. 1-3 illustrate a preferred technique of fabrication. To this end, it is contemplated that materials include suitable lens 10 and matrix 12 glasses (FIG. 4). These glasses, initially in the form of rod 14 and cladding tube 16 components (FIG. 1), are assembled as shown, zone heated by elements 18 and drawn to desired cross-sectional size, i.e. the rod 14 glass is brought to the needed lens 10 diametral size.

It will be appreciated by those skilled in the art that juxtapositioned strips of glass may be substituted by cladding tube 16 and that the above drawing procedure is per se conventional. Those requiring details, however, may refer to U.S. Pat. Nos. 2,980,957; 3,037,241; and 4,246,016.

Glasses of the rod 14 and cladding tube 16 preform which are suitable for practice of the present invention may respectively contain substantial proportions of thalium oxide and potassium oxide for $Tl^+$ and $K^+$ ion interdiffusion. Exemplary compositions are disclosed in U.S. Pat. Nos. 3,941,478 and 3,801,181.

Ion interdiffusion in glasses 14a and 16a (FIG. 2) of draw 20 (FIG. 1) is accomplished by orderly assembling cylindrical sections 22 cut from draw 20 (FIG. 3) in a support 24. The assembly 26 of sections 22 is then heated, e.g. with heating coils 28, to the extent of rendering glasses 16a homogeneous as matrix 12 (FIG. 4) while maintaining the integrity of glasses 14a of lenses 10. At the same time, interdiffusion of $Tl^+$ ions of glasses 14a and $K^+$ ions of glasses 16a takes place with the result of producing a radial gradation of refractive index in the elements of glasses 14a which renders lenses 10 self-focussing according to well known principles detailed in U.S. Pat. No. 4,246,016, i.e. the lenses 10 are caused to each exhibit an index gradient from maximum at axis A (FIG. 5) to minimum at interface with matrix 12. This index gradient is of the well known parabolic form represented by:

$$N = N_o(1 - ar^2)$$

where:
 $N$ = variable index
 $N_o$ = refractive index on lens axis
 $r$ = radius (from axis of lens)
 $a$ = constant Appropriate time-temperature cycles and applied pressures (arrows 30) subjected to assembly 26 (FIG. 3) for desirable ion interchange without lens 10 deformation are given in U.S. Pat. No. 4,246,016.

The resulting multi-lens strip 32 (FIGS. 4-6) is cut to proper lens 10 length l, preferably for 1:1 imaging purposes as illustrated in FIG. 5. It should be understood that sections 22 (FIG. 3) may, if desired, be cut to this length prior to assembly so as to obviate subsequent cutting of strip 32. In either case, opposite ends of lenses 10 of strip 32 are optically polished as would be expected.

Arrows 34 and 36 in FIG. 5 represent object and image respectively of the aforesaid 1:1 ratio, the image 36 being erect. Arrows 34 and 36 further represent object and image planes respectively and the well known imaging rules of self-focussing lenses are depicted with interconnecting lines 38 and 40.

Further according to the present invention, matrix 12 and glasses 16a (FIG. 2) having a refractive index approximating the minimums of lenses 10 are rendered light-absorbing for avoidance of stray light interference in strip 32 and to reduce the tendency for reflection of light at the interfaces between lenses 10 and matrix 12 in the event of slight residual refractive index differences. This is accomplished by addition to the composition of glass 16a of tube 16 (prior to formation of the tube), a small amount of light-absorbing ions such as Fe, Fe in conjunction Ti, Mn, Cr, Cu, Co or combinations thereof. For example, 1% to 5% Fe or Mn is appropriate for accomplishing a Density of from 0.5 to 1 per millimeter thickness of matrix 12 material. The above is based upon Density 1 equalling 10% transmission per millimeter.

Copier application of strip 32 as illustrated in FIG. 6 where lettering 42 on object 44 (e.g. a sheet of paper) is 1:1 imaged by strip 32 upon transfer member 46, i.e. as image 48. Transfer member 46 may comprise a photosensitive belt or drum which, in well known fashion, is adapted to transfer the image 48 to a copy sheet (not shown) for correct reading. These copier details being well known in the art and not per se forming a part of the present invention will not be further discussed.

Various modifications and adaptations of the precise form of the invention described above may be made to suit particular requirements and, accordingly, it is intended that all such modifications which incorporate the novel concept disclosed are to be construed as coming within the scope of the claims or the range of equivalency to which they are entitled in view of the prior art.

I claim:

1. A lens array comprising:
   an arrangement of juxtapositioned cylindrical sections of glass each having a radial gradation of refractive index ranging from a maximum at its axis to an outermost minimum and a length defining object and image planes according to imaging rules of self-focussing lenses;
   a matrix of supporting glass surrounding each of said sections, said matrix having a refractive index approximating said minimum of said graded index sections and further having light-absorbing properties for absorption of light straying from said sections.

2. A lens array according to claim 1 wherein said length of said sections is selected for erect imagery of objects at said object plane.

3. A lens array according to claim 1 wherein said arrangement of cylindrical sections of glass and matrix is in strip form for image copier application.

4. A lens array according to claim 1 wherein said light-absorbing properties afford said matrix with a Density of approximately 0.5 to approximately 1 per millimeters when a Density of 1 represents 10% transmission per millimeter.

5. A method of making a lens array comprising the steps of:
   providing a perform of rod and cladding ion exchangeable glasses;
   heating and drawing the preform to the extent of rendering said rod of glass of a diametral size corresponding to that desired of lenses of said array;
   cutting the draw into multiple lengths;
   assembling said lengths in an orderly array;
   heating the array to a temperature sufficient to render said cladding glass homogeneous as a matrix about said rod glasses and, at the same time, effect interdiffusion of ions from one of said glasses into the other to the extent of rendering said rod glasses radially graded in refractive index; and
   at one stage of said method, cutting said rod glasses to desirable image forming lengths and optically polishing opposite faces thereof.

6. The method according to claim 5 wherein said cladding glasses are rendered at least partially light-absorptive.

* * * * *